United States Patent
Yoon et al.

(10) Patent No.: US 9,666,939 B2
(45) Date of Patent: May 30, 2017

(54) ANTENNA BANDWIDTH EXPANDER

(71) Applicants: JOINSET CO., LTD., Ansan-si, Kyeonggi-do (KR); Sun-Ki Kim, Gunpo-si, Kyeonggi-do (KR)

(72) Inventors: Jong-Cheol Yoon, Ansan-si (KR); Sun-Ki Kim, Gunpo-si (KR); In-Yeup Song, Ansan-si (KR)

(73) Assignees: Joinset Co., Ltd. (KR); Sun-Ki Kim (KR)

( * ) Notice: Subject to any disclaimer, the term of this patent is extended or adjusted under 35 U.S.C. 154(b) by 0 days.

(21) Appl. No.: 14/987,212

(22) Filed: Jan. 4, 2016

(65) Prior Publication Data

US 2016/0240918 A1    Aug. 18, 2016

(30) Foreign Application Priority Data

Feb. 17, 2015  (KR) .................. 10-2015-0023812
Oct. 21, 2015  (KR) .................. 10-2015-0146862

(51) Int. Cl.
*H04B 1/40*   (2015.01)
*H01Q 1/50*   (2006.01)
*H01Q 1/24*   (2006.01)
*H04B 1/04*   (2006.01)
*H04B 1/18*   (2006.01)
*H01Q 1/38*   (2006.01)
*H01Q 5/314*  (2015.01)

(52) U.S. Cl.
CPC .............. *H01Q 1/50* (2013.01); *H01Q 1/24* (2013.01); *H01Q 1/38* (2013.01); *H01Q 5/314* (2015.01); *H04B 1/0458* (2013.01); *H04B 1/18* (2013.01); *H04B 1/40* (2013.01)

(58) Field of Classification Search
CPC .. H01Q 1/50; H01Q 1/24; H01Q 1/38; H01Q 5/314; H04B 1/18
USPC .............................. 455/77, 78, 87
See application file for complete search history.

(56) References Cited

U.S. PATENT DOCUMENTS

| | | | | |
|---|---|---|---|---|
| 2005/0007291 | A1* | 1/2005 | Fabrega-Sanchez | G01R 27/2694 343/860 |
| 2005/0148312 | A1* | 7/2005 | Toncich | H03H 7/0161 455/339 |
| 2008/0180333 | A1* | 7/2008 | Martiskainen | H01Q 1/243 343/722 |
| 2011/0043304 | A1* | 2/2011 | Tamura | H01P 1/20345 333/185 |
| 2013/0296217 | A1* | 11/2013 | Afshari | H03B 5/1228 510/300 |
| 2013/0307742 | A1* | 11/2013 | Hu | H01Q 1/243 343/821 |
| 2014/0009361 | A1* | 1/2014 | Kato | H01Q 1/243 343/860 |

(Continued)

*Primary Examiner* — MD Talukder
(74) *Attorney, Agent, or Firm* — Park & Associates IP Law, P. C.

(57) ABSTRACT

Disclosed is an antenna bandwidth expander capable of improving transmission/reception performance of a wireless communication device by expanding a bandwidth of an antenna in which broadband frequency characteristics including various communication bands are necessary like an LTE smartphone. The antenna bandwidth expander may improve the transmission and reception performance of a terminal by easily and conveniently expanding a bandwidth of an antenna in first and second resonant frequency bands.

8 Claims, 13 Drawing Sheets

(56) References Cited

U.S. PATENT DOCUMENTS

| | | | | |
|---|---|---|---|---|
| 2014/0028521 A1* | 1/2014 | Bauder | ............... | H03H 7/38 |
| | | | | 343/861 |
| 2014/0038516 A1* | 2/2014 | McFarthing | ......... | H01Q 1/2208 |
| | | | | 455/41.1 |
| 2014/0073267 A1* | 3/2014 | Cabanillas | .......... | H04B 1/0458 |
| | | | | 455/79 |
| 2014/0273887 A1* | 9/2014 | Black | ................ | H03H 7/40 |
| | | | | 455/77 |
| 2015/0145601 A1* | 5/2015 | Moronval | ............. | H03F 3/211 |
| | | | | 330/295 |
| 2015/0295542 A1* | 10/2015 | Moronval | ............ | H03F 1/0288 |
| | | | | 455/561 |
| 2016/0126623 A1* | 5/2016 | Maxim | ............... | H01L 23/315 |
| | | | | 343/860 |
| 2016/0126639 A1* | 5/2016 | Kim | .................. | H02J 50/10 |
| | | | | 307/104 |

* cited by examiner

ANTENNA BANDWIDTH EXPANDER

REFERENCE TO RELATED APPLICATIONS

This application claims the priority benefit of Korean Patent Application No. 10-2015-0023812 filed on Feb. 17, 2015, and Korean Patent Application No. 10-2015-0146862 filed on Oct. 21, 2015, the entire contents of which are incorporated herein by reference.

FIELD OF THE INVENTION

The present invention relates to an antenna bandwidth expander installed between an antenna and an internal RF circuit, and more particularly, to a technology for applying the antenna bandwidth expander to a broadband communication system of which a frequency band is broadening to improve transmission/reception performance of a communication terminal.

BACKGROUND OF THE INVENTION

Recently, according to commercialization of long term evolution (LTE) mobile communication terminals and various communication services such as the Internet of things, frequency bands required to be supported by one terminal are gradually increased and the antenna size becomes small due to a slim design of a product and employment of a high-capacity battery.

Under such a situation, researches for developing antennas capable of realizing multi-bands and a broadband with a small size are being performed in various aspects of a design technique and manufacturing process methods, but these can't overcome the size limitation of the antenna. In particular, for an LTE communication terminal, in order to overcome the difficulty in realizing broadband antenna characteristics, frequency band switching using a tunable antenna module or an RF switch such as SPDT is applied thereto, but there are disadvantages in cost and complexity of circuit design.

For example, FIG. 1A illustrates a method for controlling an LC value inside a TAM to tune antenna matching in real time by determining a traveling wave toward an antenna and a reflection wave from the antenna respectively through power detection and by digitally adjusting a DAC value in order to maintain a relative reflection amount smaller than a certain reference value (i.e. to manage on the basis of a voltage standing wave ratio (VSWR)).

FIG. 1B illustrates a structure for controlling grounding and feeding terminal positions of an antenna to switch it to a desired frequency. In the drawing, SW1 and SW2 denote switches, and M1 and M2 denote matching circuits.

This structure uses a resonant frequency shift according to a difference between resonant lengths of an antenna when the SW1 is connected and when the SW2 is connected.

According to a typical technique illustrated in FIG. 1A, there is a limitation in that a software algorithm for optimizing performance is complicated, a manufacturing cost increases due to the application of the TAM, a complex control circuit is necessary for controlling the TAM, and it causes a lack of PCB mounting area. In addition, since highly lossy L and C are applied to broaden the tuning range, loss by the lumped elements grows. Furthermore, application of external DC power may cause a noise issue on the antenna.

According to a typical technique illustrated in FIG. 1B, a degree of frequency shift varies according to an adequate separation distance d between the grounding and feeding lines, and when a distance from the feeding terminal is out of a certain distance, an antenna matching characteristic becomes worse in a specific frequency band. Accordingly, when a large amount of frequency shift is necessary, a characteristic of an unselected frequency band according to on/off of the switch becomes degraded. In addition, since an antenna element and a DC power line are electrically connected, sensitivity of a received signal may be degraded by an influence of antenna noise due to the power line.

SUMMARY OF THE INVENTION

An object of the present invention is to provide an antenna bandwidth expander capable of improving transmission/reception performance of a communication terminal by improving a troublesome limit of a narrow band characteristic of a small antenna and by applying it to a broadband communication system of which frequency band is getting broader.

Another object of the present invention is to provide an antenna bandwidth expander of which a structure is simple and a manufacturing cost is cheap, and which does not occupy a large mounting area.

Still another object of the present invention is to provide a method for replacing a switch-based circuit design, which requires a high cost and a complex design, by using an antenna bandwidth expander, and to secure technology for application of low-low LTE carrier aggregation (CA).

According to an aspect of the present invention, there is provided an antenna bandwidth expander mounted between an RF system and an antenna to be electrically connected thereto in a circuit board. The antenna bandwidth expander includes: a first conduction terminal electrically connected to the antenna; a second conduction terminal electrically connected via the first conduction terminal and a first capacitor; a first coil electrically connected between the first and second conduction terminals; a third conduction terminal electrically connected to an output port of the RF system; a fourth conduction terminal electrically connected via the third conduction terminal and a second capacitor; a second coil electrically connected between the third and fourth conduction terminals; and third and fourth capacitors respectively disposed between the second and third conduction terminals and between the first and fourth conduction terminals, wherein the second and fourth capacitors respectively connected to the second coil in parallel and in serial to form a resonant circuit in a first frequency band that is a low frequency band, and the first and third capacitors respectively connected to the first coil in parallel and in serial to form a resonant circuit in a second frequency band that is a high frequency band, and wherein the first and second coils are wound in opposite directions to be magnetically coupled.

According to another aspect of the present invention, there is provided an antenna bandwidth expander mounted between an RF system and an antenna to be electrically connected thereto in a circuit board. The antenna bandwidth expander includes: a ceramic body having first to fourth conduction terminals separately formed on a bottom surface and including therein a first coil electrically connected between the first and second conduction terminals and a second coil electrically connected between the third and fourth terminals; and first to fourth capacitors disposed between first to fourth conduction pads formed in correspondence to the first to fourth conduction terminals in the circuit board, wherein the first conduction terminal is electrically connected to the antenna, the third conduction terminal is electrically connected to an output port of the RF system, the second and fourth capacitors are respectively connected to the second coil in parallel and in serial to form a first resonant circuit in a first frequency band that is a low frequency band, and the first and third capacitors are respectively connected to the first coil in parallel and in serial to form a resonant circuit in a second frequency band that is a high frequency band, and wherein the first and second coils are wound in opposite directions to be magnetically coupled.

The first coil may be positioned inside the second coil.

Horizontal cross-sectional shapes of the first and second coils may be a circle or a polygon.

The second and fourth conduction terminals may be electrically connected to a ground via an external inductor.

According to still another aspect of the present invention, there is provided an antenna bandwidth expander including a first ceramic sheet having conduction terminals at four bottom corners and a ground terminal at a center; a second ceramic sheet having a first capacitor pattern formed thereon; a plurality of third ceramic sheets having the first capacitor pattern or a second capacitor pattern, and first and second coil patterns formed thereon; and a fourth ceramic sheet having the first capacitor pattern formed thereon, wherein the ceramic sheets are sequentially stacked, the first and second coil patterns are connected through via holes to form a coil and to be magnetically coupled, and the first and second capacitor patterns overlap to form a capacitor in the stacked state, and wherein the coil and the capacitor are electrically connected to the conduction terminal through a via hole.

According to still another aspect of the present invention, there is provided an antenna bandwidth expander including: a first ceramic sheet having conduction terminals at four bottom corners and a ground terminal at a center; a second ceramic sheet having one connection pattern formed thereon; a plurality of ceramic sheets having first and second coil patterns formed thereon; and a fourth ceramic sheet having another connection pattern formed thereon, wherein the ceramic sheets are sequentially stacked and the first and second coil patterns are connected through respective via holes to form a coil and to be mutually magnetically coupled, and wherein the coil is electrically connected to the conduction terminal through the connection pattern and a via hole.

The first and second coil patterns may be formed on different ceramic sheets.

BRIEF DESCRIPTION OF THE DRAWINGS

The above objects and other advantages of the present invention will become more apparent by describing in detail exemplary embodiments thereof with reference to the attached drawings in which:

FIG. 3A illustrates a structure in which coil patterns influencing low and high frequency bands are joined and FIG. 3B illustrates a structure in which coil patterns influencing low and high frequency bands are separated, and FIG. 3C illustrates an alternative embodiment of coil pattern;

DETAILED DESCRIPTION OF THE INVENTION

Hereinafter, an antenna bandwidth expander according to the embodiments of the present invention will now be described in detail with reference to the accompanying drawings.

Figure 1A:
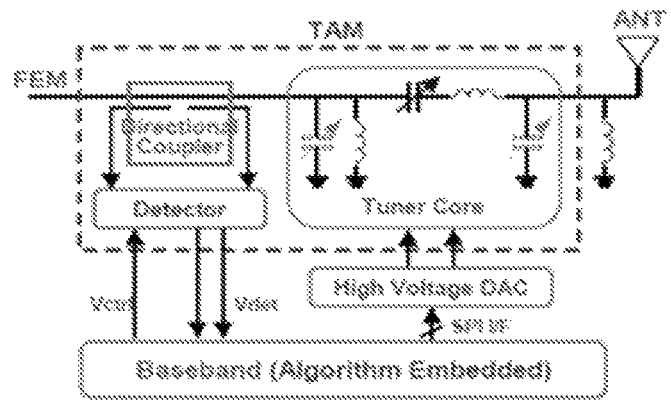
FIGS. 1A and 1B illustrate related arts.
Figure 1B:
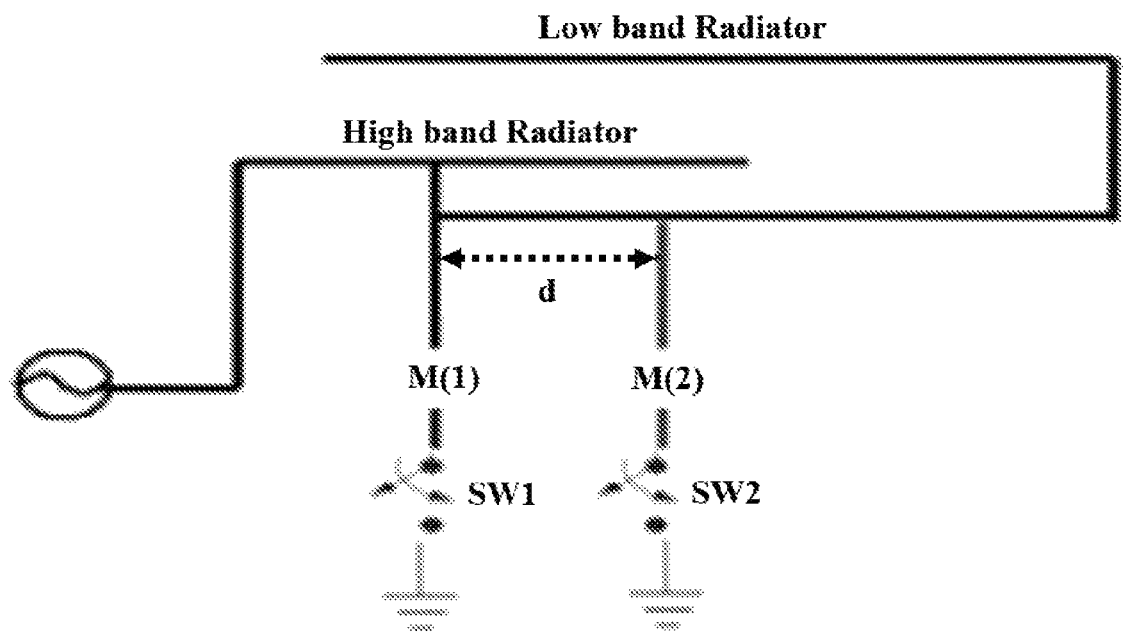
Figure 2A:
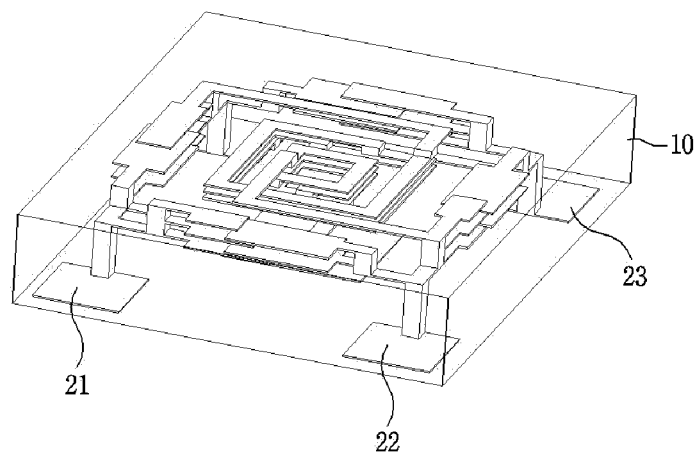
FIGS. 2A and 2B illustrate an antenna bandwidth expander and respective layer structures thereof according to an embodiment of the present invention.
Figure 2B:
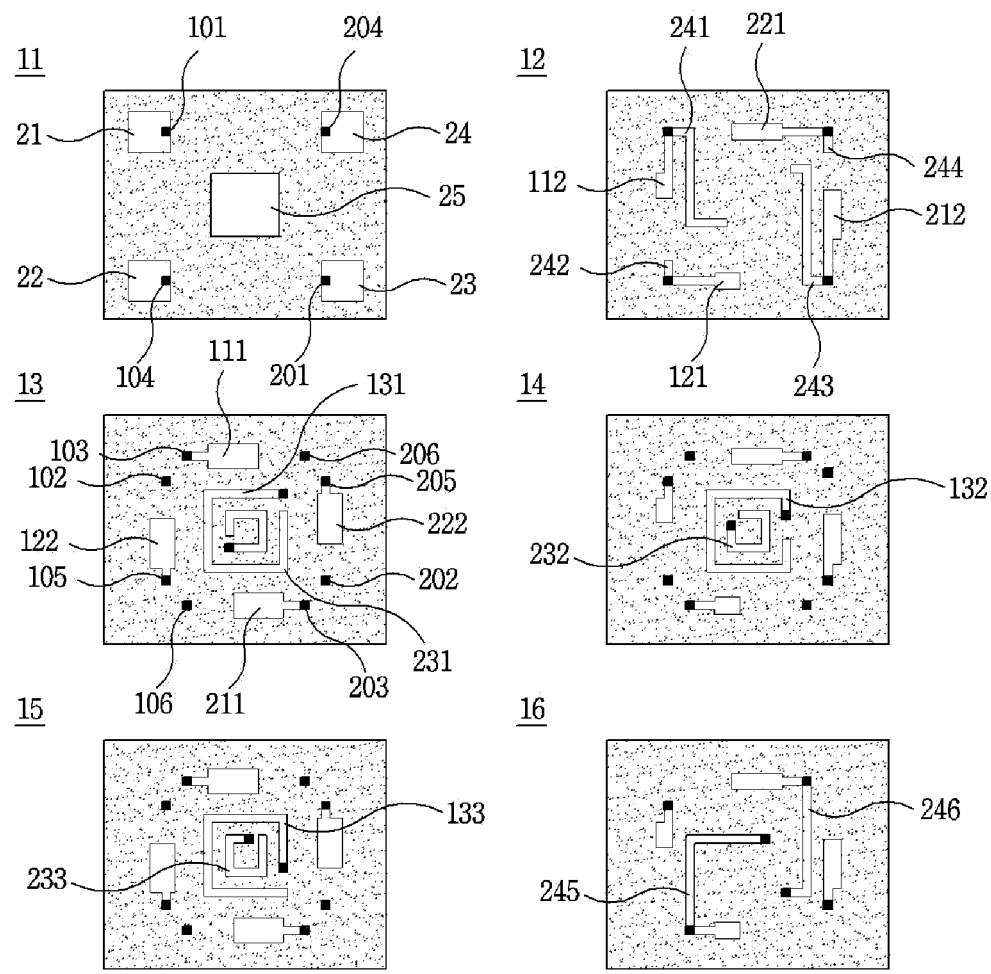
Figure 3A:
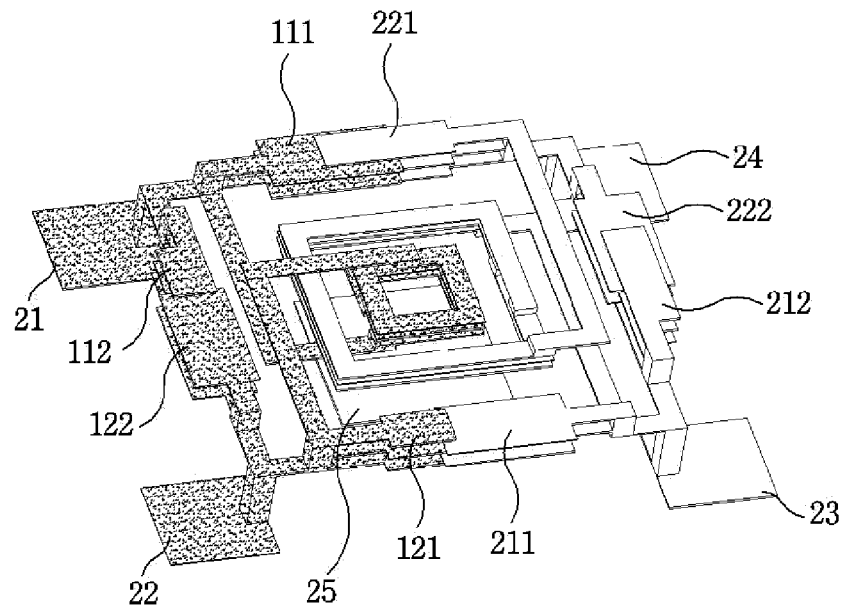
FIGS. 3A, 3B and 3C illustrate an internal connection structure of an antenna bandwidth expander according to an embodiment of the present invention.
Figure 3B:
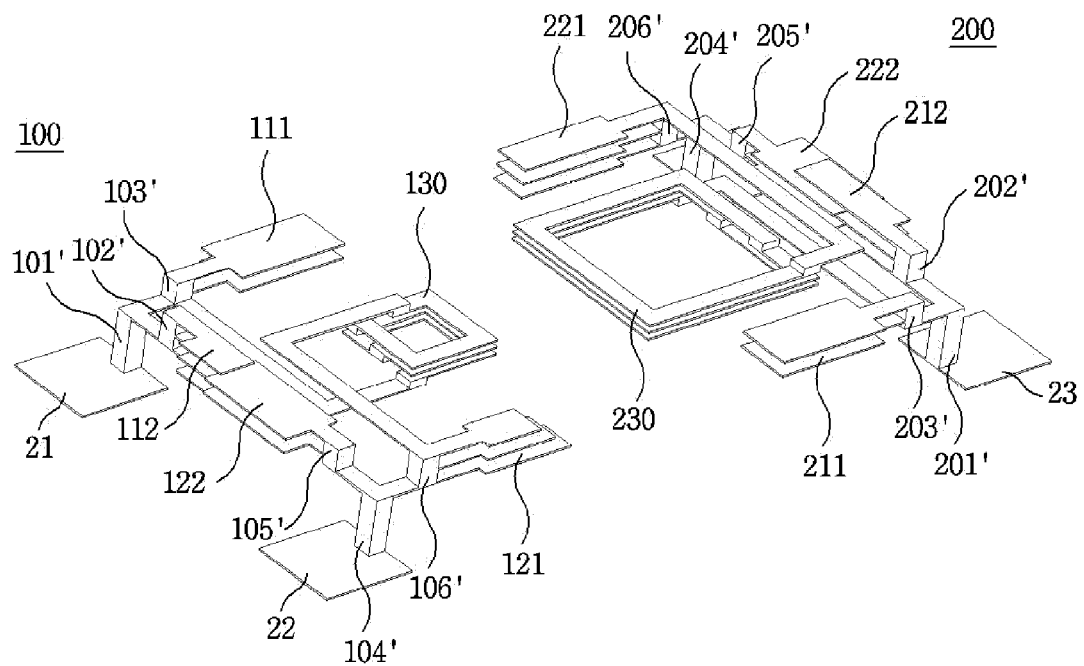
Figure 3C:
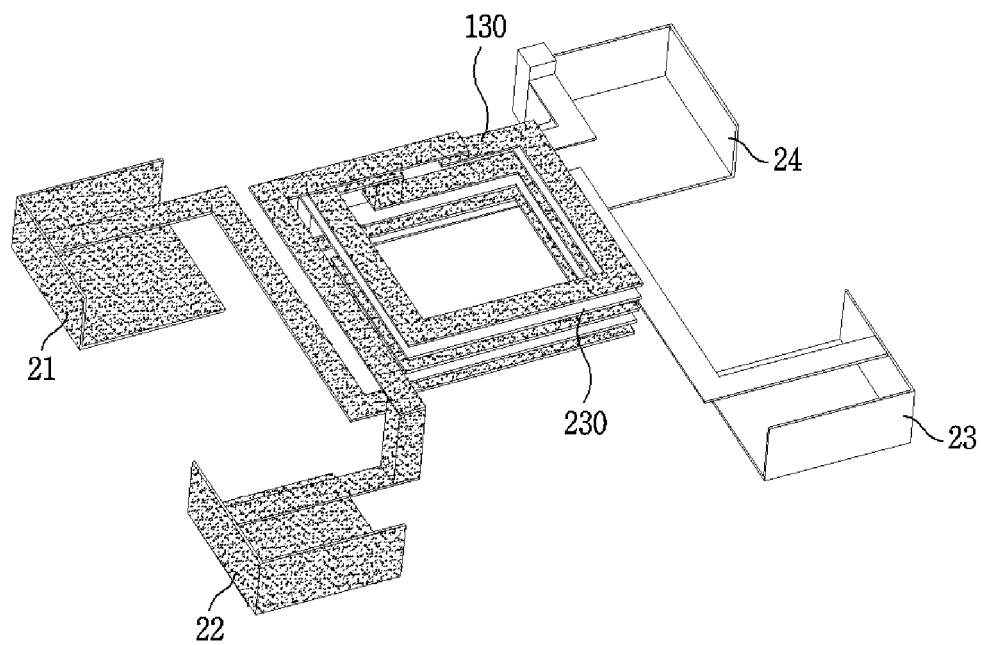
Figure 4:
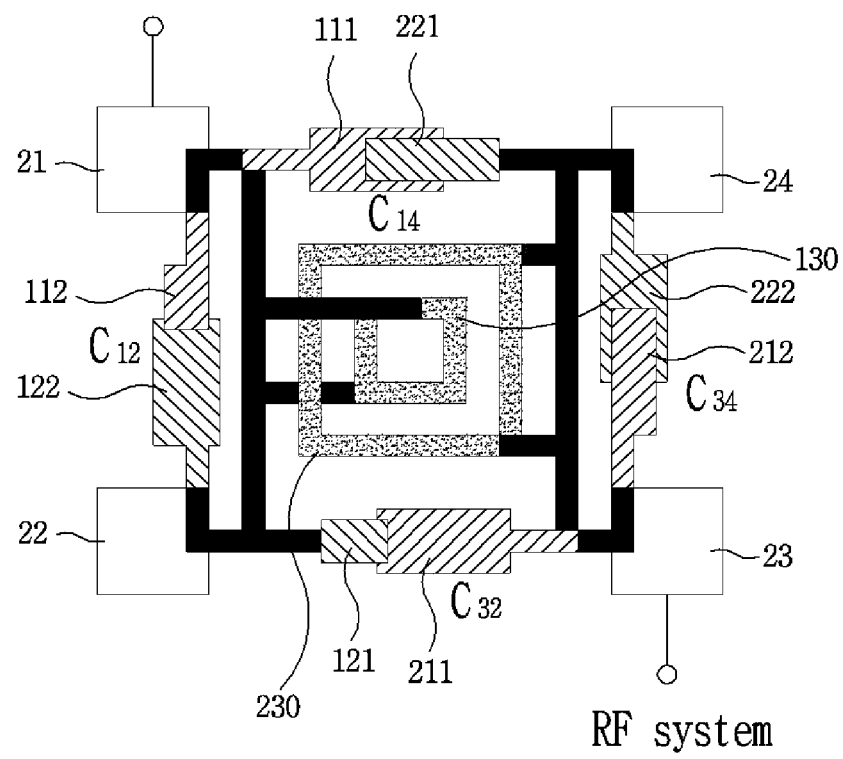
FIG. 4 is an internal plan view of an antenna bandwidth expander according to an embodiment of the present invention.

FIG. 2A illustrates an antenna bandwidth expander according to an embodiment of the present invention, and FIG. 2B illustrates structures of respective layers according to an embodiment of the present invention. FIGS. 3A and 3B illustrate an internal connection structure of an antenna bandwidth expander according to an embodiment of the present invention. FIG. 3A illustrates a structure in which coil patterns influencing low and high frequency hands are coupled and FIG. 3B illustrates a structure in which coil patterns influencing low and high frequency hands are separated and FIG. 3C illustrates an alternative embodiment of coil pattern. FIG. 4 is an internal plan view of an antenna bandwidth expander according to an embodiment of the present invention. In FIG. 3B, reference numerals will be omitted for similar conductive patterns.

An antenna bandwidth expander is provided with a ceramic body 10 having a pentagonal shape, and the ceramic body 10 is configured with stacked ceramic sheets 11, 12, 13, 14, 15, and 16, each of which has a conductive pattern thereon. On the bottom surface of the ceramic body 10, conductive terminals 21, 22, 23, and 24 and a ground terminal 25 are exposed. Here, the ground terminal 25 may be a dummy terminal for increasing the strength of soldering and has little influence on characteristics even if being omitted. When the ground terminal 25 is omitted, the conductive terminals 21, 22, 23, and 24 exposed on the bottom surface may have structure extending to side surfaces of the ceramic body 10.

The antenna bandwidth expander is surface-mountable by a vacuum pickup. For example, the antenna bandwidth expander is mounted in a circuit board installed in a mobile phone and electrically connected between an output port of an RF system and a feeding port connected to an antenna.

Conductive patterns printed on respective ceramic sheets (or green sheets) 11, 12, 13, 14, 15, and 16 of the ceramic body 10 electrically and magnetically connected in a three-dimensional form through via holes to form a circuit.

In other words, as illustrated in FIG. 2B, in the ceramic sheets 11 to 16 of respective layers, for example, 6 layers in the embodiment, the conductive patterns (i.e. coil patterns, capacitor patterns, or connection patterns) are formed by printing, for example, Ag paste, and the ceramic body 10 may be formed by stacking the ceramic sheets 11 to 16 and by plastic working in a low temperature co-fired ceramic (LTCC) technique.

As described above, the conductive terminals 21, 22, 23, and 24 are formed at bottom four corners of the ceramic sheet 11, the ground or dummy terminal 25 is formed at the center thereof, and via holes 101, 104, 201, and 204 are formed in the ceramic sheet 11 at certain positions of respective conductive terminals 21, 22, 23, and 24.

Here, same reference numerals are given to via holes formed at the same position of the ceramic sheets.

Capacitor patterns 112, 121, 212, and 221 and connection patterns 241, 242, 243, and 244 are formed on the top surface of the ceramic sheet 12 and in order to electrically connect these to the conductive terminals 21, 22, 23, and 24 of the ceramic sheet 11, via holes are formed at the same positions as those of the via hole 101, 104, 201, and 204 formed on the ceramic sheet 11.

Capacitor patterns 111, 122, 211, and 222, and coil patterns 131 and 231 are formed on the ceramic sheet 13, capacitor patterns 112, 121, 212, and 221, and coil patterns 132, and 232 are formed on the ceramic sheet 14, capacitor patterns 111, 122, 211, and 212, and coil patterns 133 and 233 are formed on the ceramic sheet 15, and capacitor patterns 112, 121, 212, and 221, and connection patterns 245 and 246 are formed on the ceramic sheet 16.

Via holes for electrical and vertical connection are formed in each of the ceramic sheets 13, 14, 15, and 16, as illustrated in FIG. 2B. Via holes 101, 104, 201, and 204 for direct electrical connection to the conductive terminals 21, 22, 23, and 24, via holes (not numerically referenced) for mutual electrical connection of the coil patterns 131, 132, and 133, and 231, 232, and 233, and via holes 102 and 103, 105 and 106, 202 and 203, and 205 and 206 for respective electrical connections of capacitor patterns 111 and 112, 121 and 122, 211 and 212, and 221 and 222 to conductive terminals 21, 22, 23, and 24, are formed at proper positions in each ceramic sheet 13, 14, 15, and 16. Via holes including via holes not described above are represented black quadrangular points in FIG. 2B.

Stereoscopically representing these as illustrated in FIG. 3B, the conductive terminals 21, 22, 23, and 24 are respectively connected to the capacitor patterns 111 and 112, 121 and 122, 211 and 212, and 221 and 222 through conductive plugs 101', 104', 201', and 204' filled in the via holes 101, 104, 201, and 204, and conductive plugs 102' and 103', 105' and 106', 202' and 203', and 205' and 206' filled in the via holes 102' and 103', 105' and 106', 202' and 203', and 205' and 206', and respectively connected to the coil 1 130 and the coil 2 230 through conductive plugs 103', 106', 203', and 206' filled in the via holes 103, 106, 203, and 206.

Overall, respective capacitor patterns 111 and 112, 121 and 122, 211 and 212, and 221 and 222 form capacitors, and the coil patterns 131, 132, and 133, and 231, 232, and 233 form coil 1 130 and coil 2 230 that are magnetically coupled, and description about a circuit related thereto will be described later.

The embodiment exemplifies that, the coil patterns 131, 132, and 133 forming the coil 1 130 are encompassed with the coil patterns 231, 232, and 233 forming the coil 2 230, respectively, and they are all formed on the same ceramic sheets 13, 14, and 15, but they may be also formed on ceramic sheets forming different layers, if necessary.

For example, FIG. 3C illustrates only a coupling relation of coils, while other elements are excluded therefrom for convenience of drawing. A coil 1 130 and a coil 2 230 are formed on ceramic sheets, which have the same size but configure different layers, and have different numbers of turns Hereinafter, configurations and operations of an antenna bandwidth expander according to an embodiment of the present invention will be described in detail.

Figure 5:
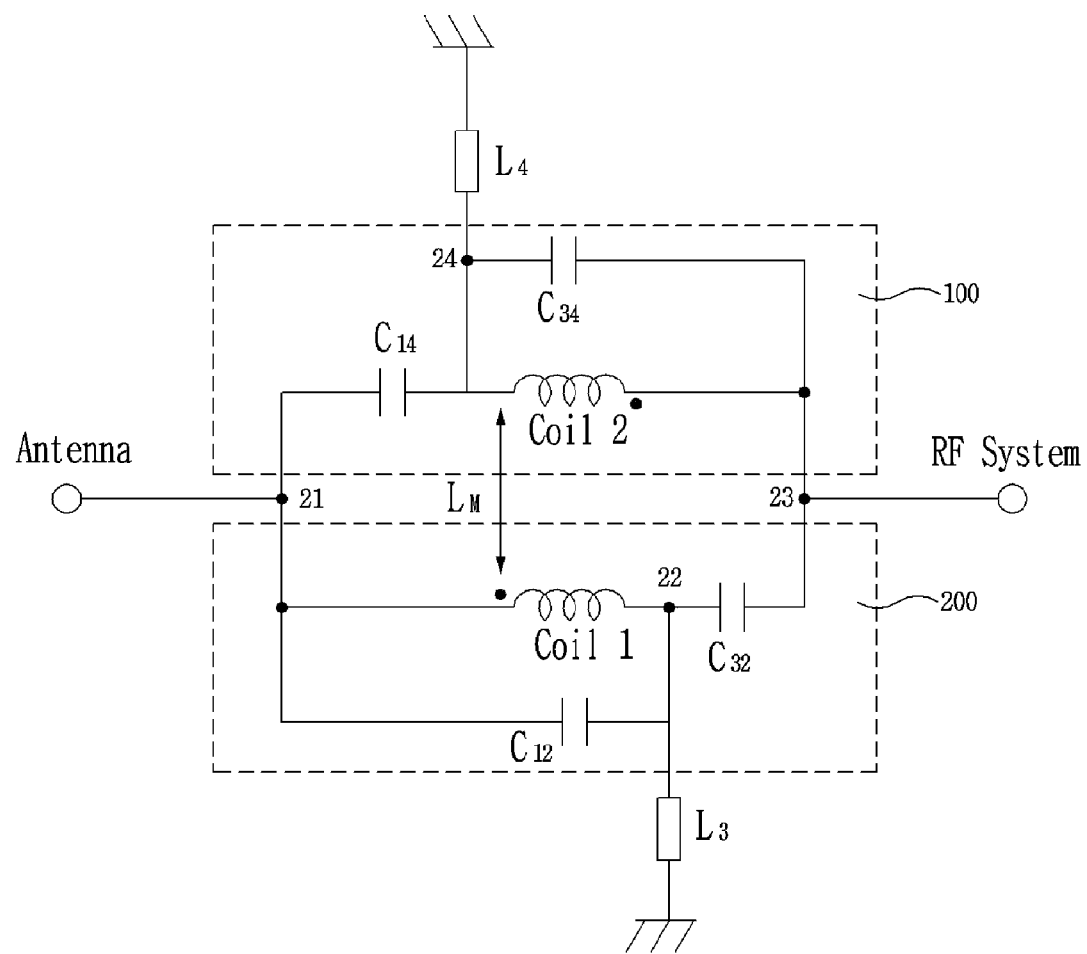
FIG. 5 is an equivalent circuit diagram of an antenna bandwidth expander according to an embodiment of the present invention.

FIG. 5 is an equivalent circuit diagram of an antenna bandwidth expander according to an embodiment of the present invention.

The antenna bandwidth expander is disposed between an antenna and an internal RF system, and in FIG. 3, the conductive terminal 21 is electrically connected to a feeding port connected to the antenna and the conductive terminal 23 is electrically connected to an output port of the RF system.

Accordingly, signal energy delivered from the RF system through the conductive terminal 23 is delivered to the coil 2 230, and induction current is coupled to the coil 1 130 by a magnetic flux component of a magnetic field generated by the coil 2 230 and is delivered to the conductive terminal 21 and then to the feeding port of the antenna.

As illustrated in FIG. 5, the coil 1 130 is wound in an opposite direction to that of the coil 2 230 to mutually induce magnetic coupling. As the result, in a low frequency band (i.e. a first resonant frequency band), a strong magnetic field coupling may be induced in a region between the coil 1 130 and coil 2 230 by the wound directions of the coil 1 130 and coil 2 230, and in a high frequency band (i.e. a second resonant frequency band), the signal energy may be delivered through the strong magnetic field in a central part region of the coil 1 130 and the coil 2 230.

In the present embodiment in which the coil 1 130 is formed inside the coil 2 230, coils are formed such that the wound directions of the coil 1 130 and the coil 2 230 are opposite to each other. However, a structure may also be possible in which magnetic coupling is formed at a central part of the coils by realizing the wound directions of the coil 1 130 and the coil 2 230 as the same.

Capacitor patterns 111 and 221, 112 and 122, 121 and 211, 212 and 222 respectively include stack structures to form capacitors $C_{14}$, $C_{12}$, $C_{32}$, and $C_{34}$, and the coil patterns 131, 132, and 133, and 231, 232, and 233 formed on each ceramic sheet 13, 14 and 15 are stacked to form the coil 1 130 and the coil 2 230.

Accordingly, capacitors $C_{12}$ and $C_{14}$, and $C_{32}$ and $C_{34}$ are respectively connected to the coil 1 130 and the coil 2 230 in parallel to load capacitance values between the conductive terminals 21, 22, 23, and 24.

Here, although each of the coil 1 130 and the coil 2 230 is not electrically connected, the induction current is coupled to the coil 1 130 by a magnetic flux component of the magnetic field generated by the coil 2 230 and the signal energy at the output port of the RF system is delivered to the feeding port of the antenna.

As described above, in the embodiment, the coil patterns 131, 132, and 133, and 231, 232, and 233, which are parts of the coil 1 130 and the coil 2 230, are formed on each ceramic sheet 13, 14, 15 at the same time, but are not limited thereto. In addition, the coil 1 130 and the coil 2 230 are formed in different sizes to have a structure in which one coil is positioned inside the other one, and the present embodiment has a structure such that the coil 1 130 is completely included in the coil 2 230, in other words, a structure for maximizing coupling between coils to minimize a loss of signal energy.

The capacitor $C_{14}$ connected to the coil 2 230 in serial and the capacitor $C_{12}$ connected to the coil 2 230 in parallel are coupled to the coil 2 230 to form an LC resonant circuit, and the capacitor $C_{12}$ connected to the coil 1 130 in serial and the capacitor $C_{32}$ connected to the coil 1 130 in parallel are coupled to the coil 1 130 to form another LC resonant circuit.

Referring to FIG. 5, an antenna bandwidth expander is divided into a first resonant frequency block 100 influencing a low frequency band and a second resonant frequency block 200 influencing a high frequency band.

Accordingly, elements mainly influencing the first resonant frequency are the coil 2 230, the capacitors $C_{14}$ and $C_{34}$, and the external inductor $L_4$, and elements influencing the second resonant frequency are the coil 1 130, the capacitors $C_{12}$ and $C_{32}$, and the external inductor $L_3$. Mutual inductance $L_M$ formed by the coil 1 and coil 2 130 and 230 influences the first and second resonant frequencies at the same time.

In brief, the coil 2 230, the capacitors $C_{14}$ and $C_{34}$, and the external inductor $L_4$ form the first resonant frequency block 100 influencing the low frequency band, and the coil 1 130, the capacitors $C_{12}$ and $C_{32}$, and the external inductor $L_3$ form the second resonant frequency block 200 influencing the high frequency band.

Here, the conductive terminals 22 and 24 are disposed between the external inductors $L_3$ and $L_4$ and are electrically connected to the ground.

The magnetic coupling of the coil 1 130 and the coil 2 230 is required to be strong in order to efficiently deliver the signal energy from the conductive terminal 23 connected to the output port of the RF system to the conductive terminal 21 connected to the feeding port of the antenna.

Typically, a coupling coefficient k is used for explaining coupling between coils, and k has a value between 0 to 1, wherein 0 means the coils are decoupled and 1 means the coils are ideally coupled. Typically, the k value is dependent on the shape, separation distance, and direction between the coils.

An antenna bandwidth expander of the present invention has a structure in which the coil 2 230 completely includes the coil 1 130 and the two coils are wound in opposite directions to be magnetically coupled. In such a structure, the signal insertion loss at the first frequency band can be minimized by reducing a separation distance between the coils and at the second frequency band, it is able to transmit the signal energy across a wideband while minimizing the insertion loss by strengthening the magnetic coupling at the central parts of the coils.

Figure 6A:
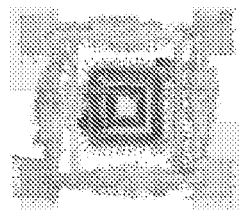
FIGS. 6A and 6B illustrate magnetic field distributions at a first resonant frequency (925 MHz) and a second resonant frequency (1990 MHz)
Figure 6B:
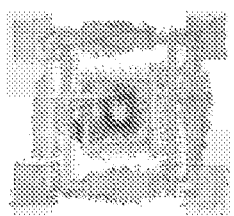

FIGS. 6A and 6B illustrate magnetic field distributions at a first resonant frequency (925 MHz) and a second resonant frequency (1990 MHz). A magnetic field is strongly formed in a region between the coil 1 130 and the coil 2 230 in the first resonant frequency and a magnetic field is strongly formed in the inner side of the coil 1 130 in the second resonant frequency.

Figure 7A:
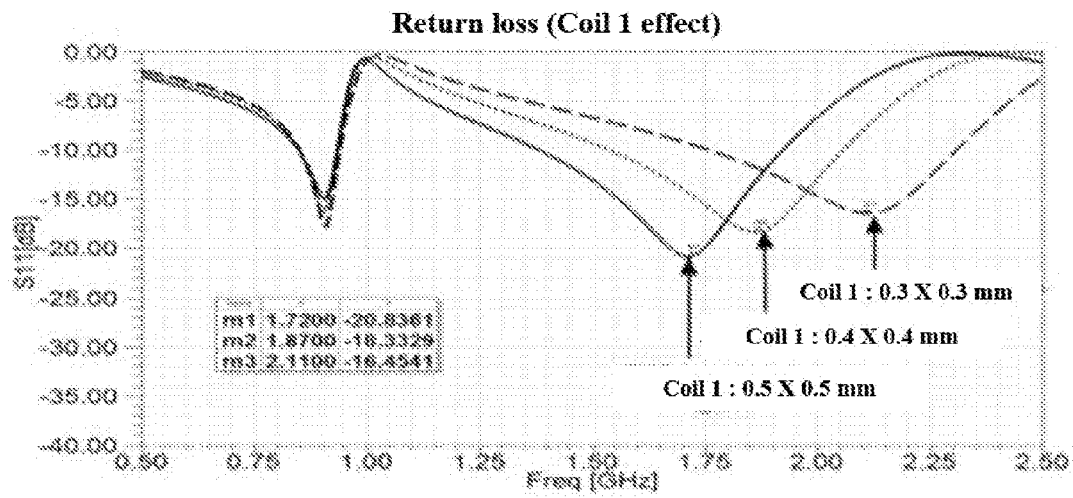
FIGS. 7A and 7B are graphs of influences of return loss with respect to the sizes of coil 1 and coil 2.

FIG. 7A is a graph of influence of a return loss with respect to the size of coil 1 130. As the size of the coil 1 becomes greater, the first resonant frequency does not have a large variation but the second resonant frequency moves to the lower frequency side.

Figure 7B:
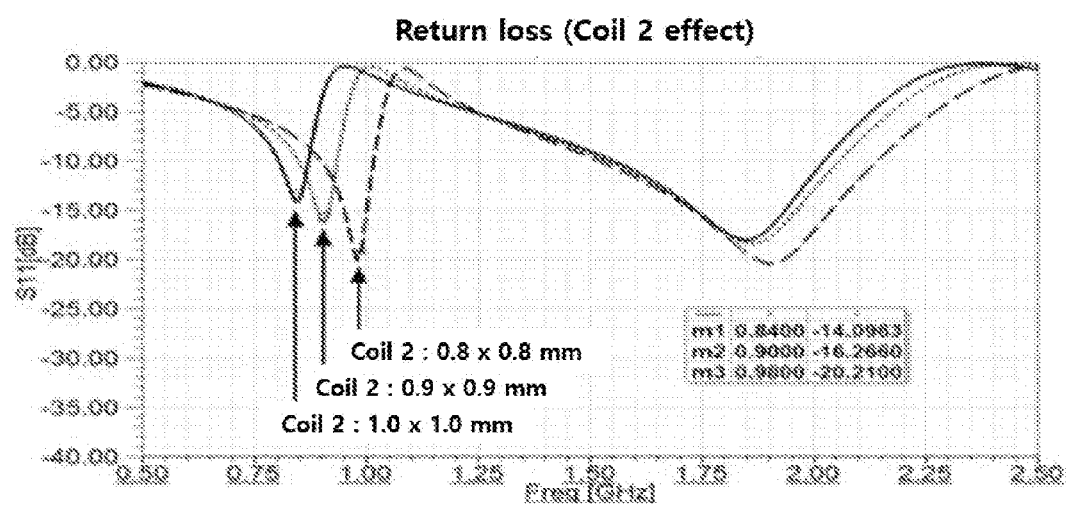

FIG. 7B is a graph of influence of a return loss with respect to the size of coil 2 230. As the size of the coil 2 becomes greater, the first resonant frequency moves to the lower frequency side and the second resonant frequency does not have a large variation.

Figure 8A:
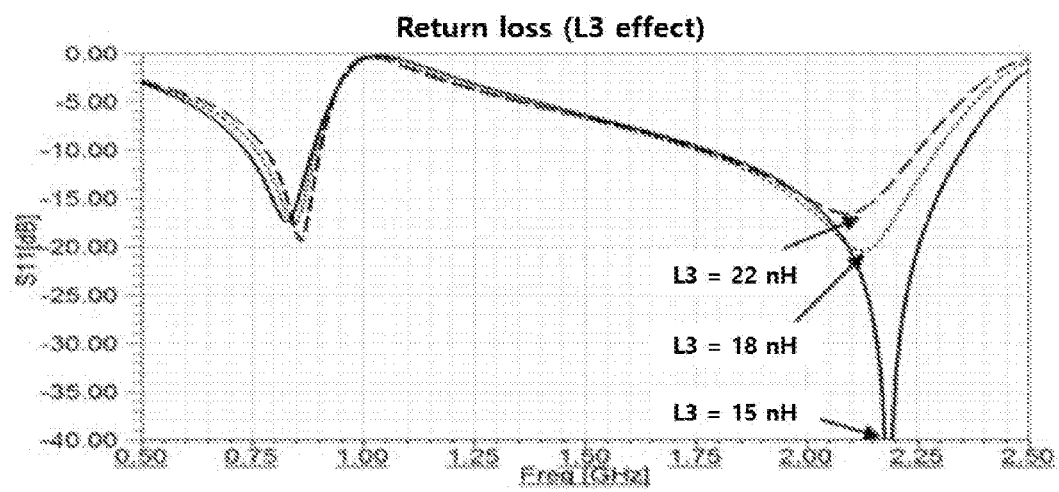
FIGS. 8A and 8B are graphs of influences of return loss with respect to external inductors $L_3$ and $L_4$.

FIG. 8A illustrates an influence of a return loss with respect to the external inductor $L_3$. As the inductance value of $L_3$ becomes lower, the second resonant frequency moves to a higher frequency side and may optimize impedance matching at the second resonant frequency through a proper value.

Figure 8B:
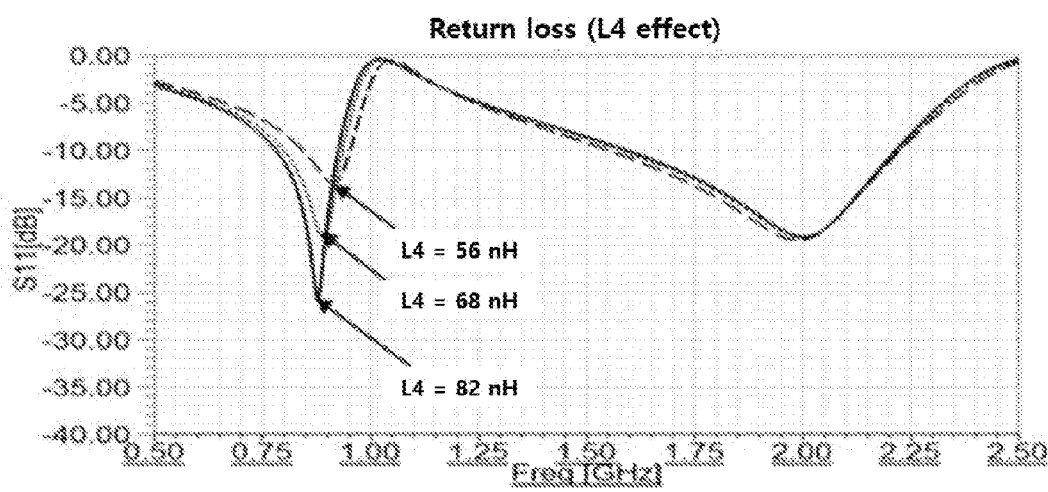

FIG. 8B illustrates an influence of a return loss with respect to the external inductor $L_4$. As the inductance value of $L_4$ becomes lower, the first resonant frequency moves to a higher frequency side and may optimize impedance matching at the second resonant frequency through a proper value.

Figure 9:
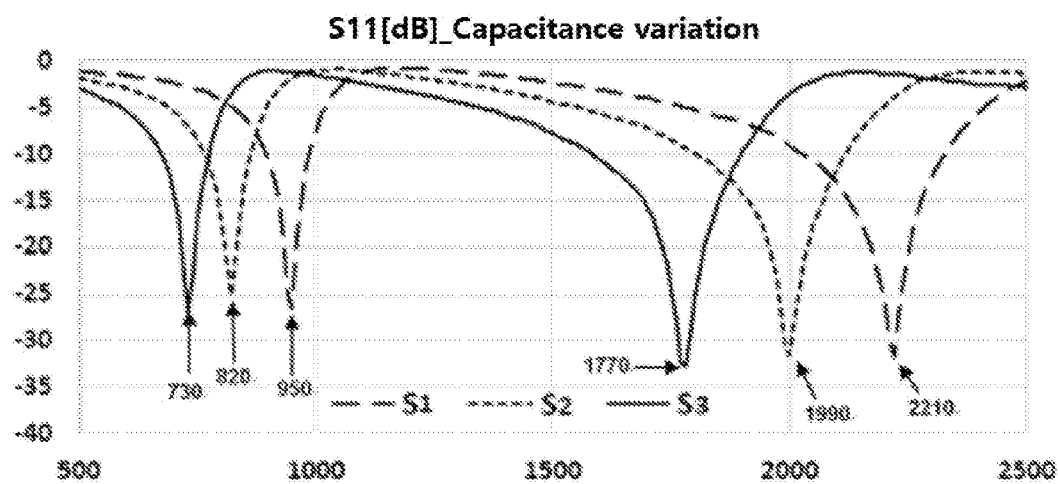
FIG. 9 is a graph representing a return loss measured through inductance values of the external inductors $L_3$ and $L_4$.

FIG. 9 represents return loss characteristics measured through proper inductance values of the external inductors $L_3$ and $L_4$, when horizontal cross-sectional shapes of the coil 1 and coil 2 respectively have rectangular shapes and the sizes of 0.5 mm×0.5 mm and 1.0 mm×1.0 mm, and influences on capacitance values of the $C_{14}$, $C_{12}$, $C_{32}$ and $C_{34}$ connected to each coil in serial and in parallel are actually measured.

The following Table 1 and Table 2 are coil sizes of a sample S and inductance values of the external inductors $L_3$ and $L_4$ applied to the measurement result of FIG. 9, and Table 3 is capacitance values applied to the measurements result of FIG. 9.

TABLE 1

| | Size (mm) | Inductance |
|---|---|---|
| Coil 1 | 0.5 × 0.5 | 5.5 nH |
| Coil 2 | 1.0 × 1.0 | 16.0 nH |

TABLE 2

| | Matching values of $L_3$ and $L_4$ | |
|---|---|---|
| Sample type | $L_3$ | $L_4$ |
| S1 | 12 nH | 47 nH |
| S2 | 15 nH | 68 nH |
| S3 | 18 nH | 82 nH |

TABLE 3

| | | Size (mm) | Capacitance |
|---|---|---|---|
| S1 | $C_{34}$ | 0.4 × 0.2 | 0.8 pF |
| | $C_{14}$ | 0.4 × 0.2 | 0.8 pF |
| | $C_{12}$ | 0.2 × 0.2 | 0.4 pF |
| | $C_{32}$ | 0.2 × 0.2 | 0.4 pF |

TABLE 3-continued

|  |  | Size (mm) | Capacitance |
|---|---|---|---|
| S2 | $C_{34}$ | 0.6 × 0.2 | 1.0 pF |
|  | $C_{14}$ | 0.6 × 0.2 | 1.0 pF |
|  | $C_{12}$ | 0.3 × 0.2 | 0.4 pF |
|  | $C_{32}$ | 0.3 × 0.2 | 0.4 pF |
| S3 | $C_{34}$ | 0.8 × 0.2 | 1.2 pF |
|  | $C_{14}$ | 0.8 × 0.2 | 1.2 pF |
|  | $C_{12}$ | 0.4 × 0.2 | 0.6 pF |
|  | $C_{32}$ | 0.4 × 0.2 | 0.6 pF |

Figure 10A:
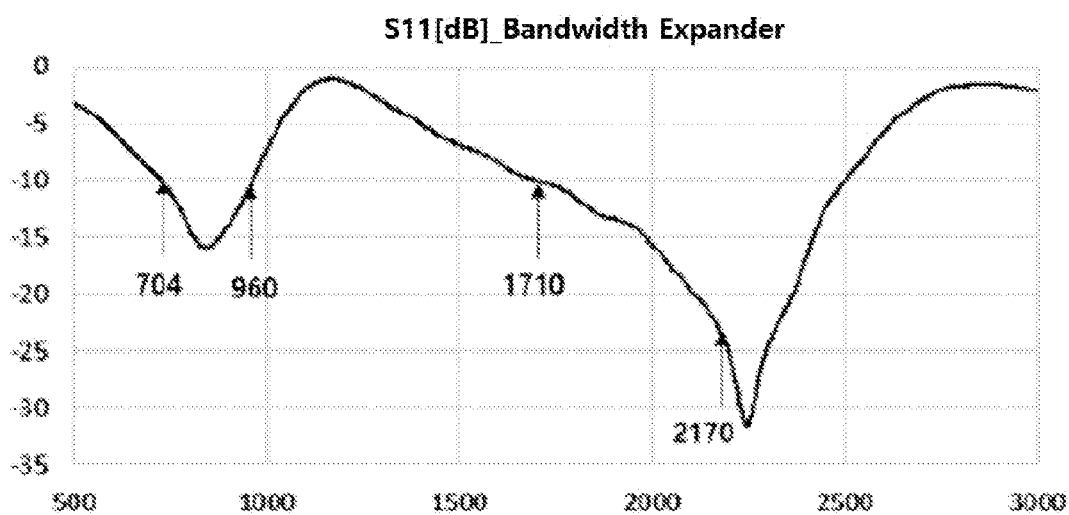
FIG. 10A is a graph representing a return loss value measured by optimizing the coil size.
Figure 10B:
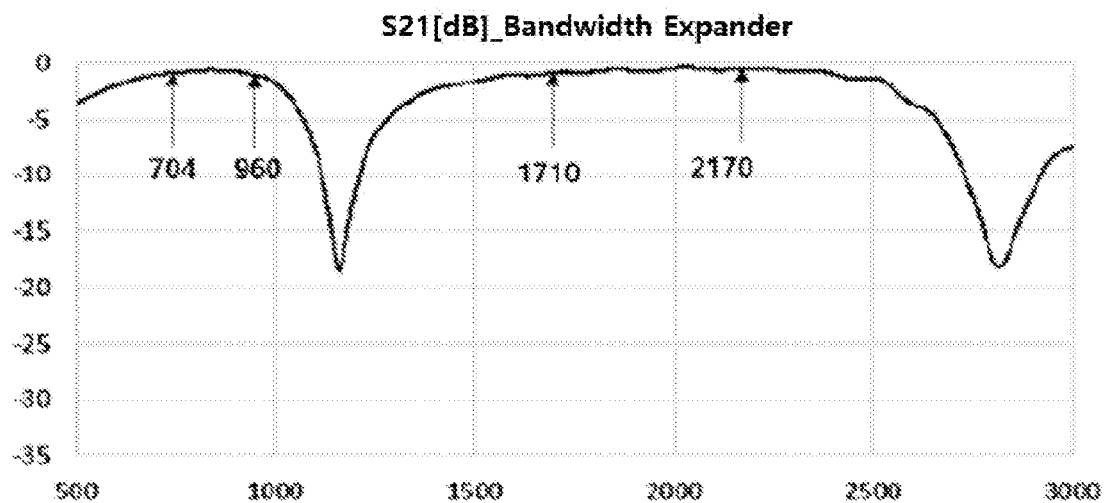
FIG. 10B is a graph representing a frequency characteristic for an insertion loss in first and second resonant frequency bands.

FIG. 10A illustrates return loss values measured by optimizing the coil size, that is, first and second resonant frequencies are optimized to a specific product, and FIG. 10B illustrates frequency characteristics with respect to an insertion loss in the first and second resonant frequency bands.

Figure 11:
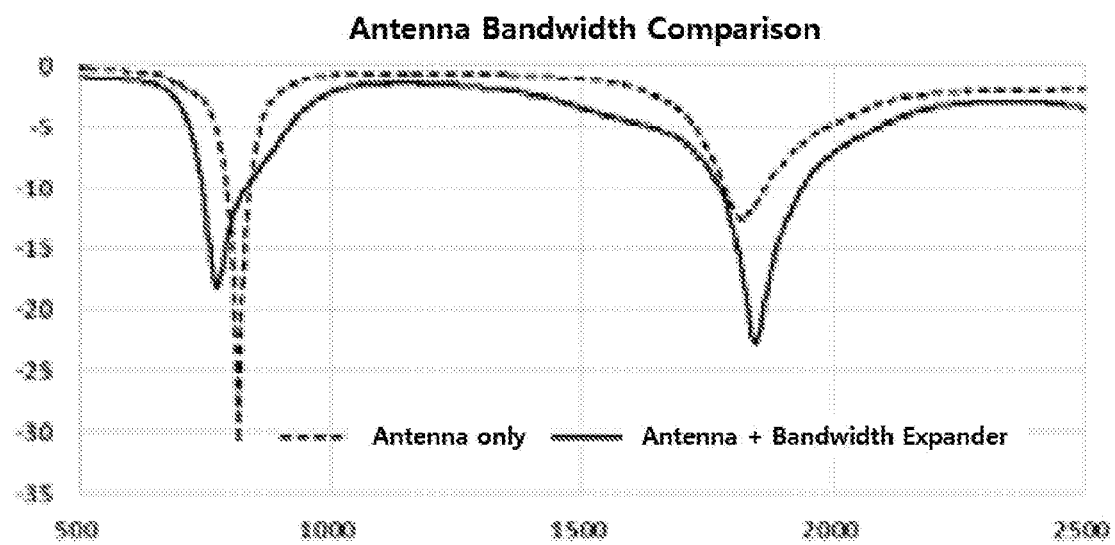
FIG. 11 is a graph obtained by comparing to measure a return loss of an antenna on which LC matching is performed in a specific product and S11 [dB] of an antenna to which an antenna bandwidth expander according to an embodiment of the present invention is applied.

FIG. 11 is a graph obtained by comparing to measure a return loss of an antenna on which LC matching is performed in a specific product and a return loss of an antenna to which an antenna bandwidth expander according to an embodiment of the present invention is applied. Table 4 represents an effect of improving a bandwidth of an antenna to which a bandwidth expander is added in comparison to an antenna provided only with an LC matching circuit.

TABLE 4

|  | Antenna bandwidth comparison (VSWR = 4.0) | |
|---|---|---|
|  | Low frequency band | High frequency band |
| Antenna only (22 nH shunt) | 765-864 (BW = 99 MHz) | 1711-2017 (BW = 306 MHz) |
| Antenna + expander ($L_3$ = 10 nH, $L_4$ = 22 nH) | 722-920 (BW = 198 MHz) | 1608-2115 (BW = 507 MHz) |
| Expanding effect of bandwidth (BW) | 100% | 65% |
| Size of sample circuit board | 130 mm × 65 mm × 0.8 mm | |

Referring to Table 4, compared to the bandwidth of an antenna designed only with an LC matching circuit, the bandwidth of an antenna including the bandwidth expander is improved by 100% at the first resonant frequency and by 65% at the second resonant frequency on the basis of a VSWR of 4.0.

Figure 12A:
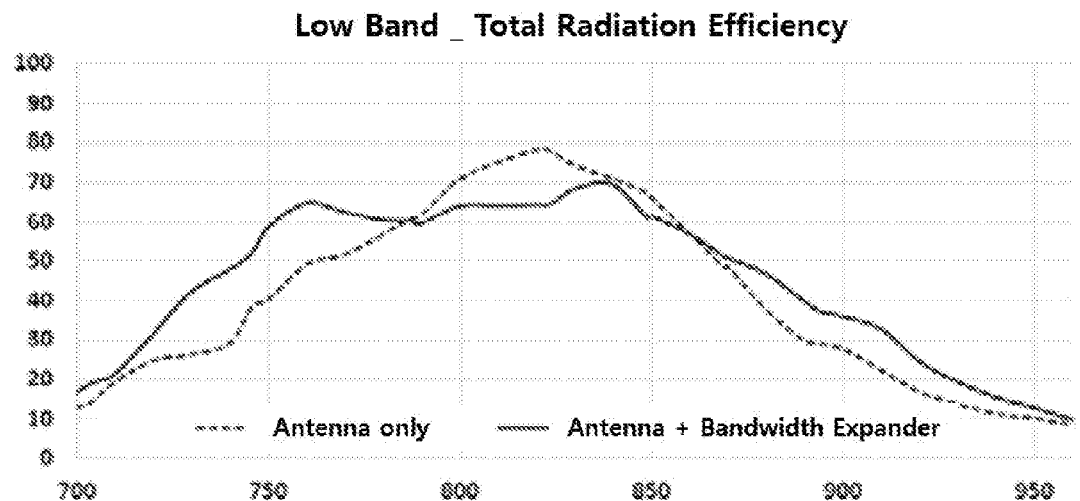
FIG. 12A is a graph illustrating a radiation efficiency in the first resonant frequency band and FIG. 12B is a graph illustrating a radiation efficiency in the second resonant frequency band.

FIG. 12A is a graph representing radiation efficiencies in the first resonant frequency band for a case where the bandwidth expander proposed in the present invention is provided and a case where only an LC matching circuit is provided.

As seen from the graphs, compared to the case where only the matching circuit is applied, the case (represented with a solid line) where the bandwidth expander is included has a lower peak radiation efficiency at a resonant frequency but the total radiation efficiency is improved by reducing a mismatching loss due to a bandwidth expansion effect at frequencies around both end boundaries and an entirely flat radiation efficiencies may be obtained.

Figure 12B:
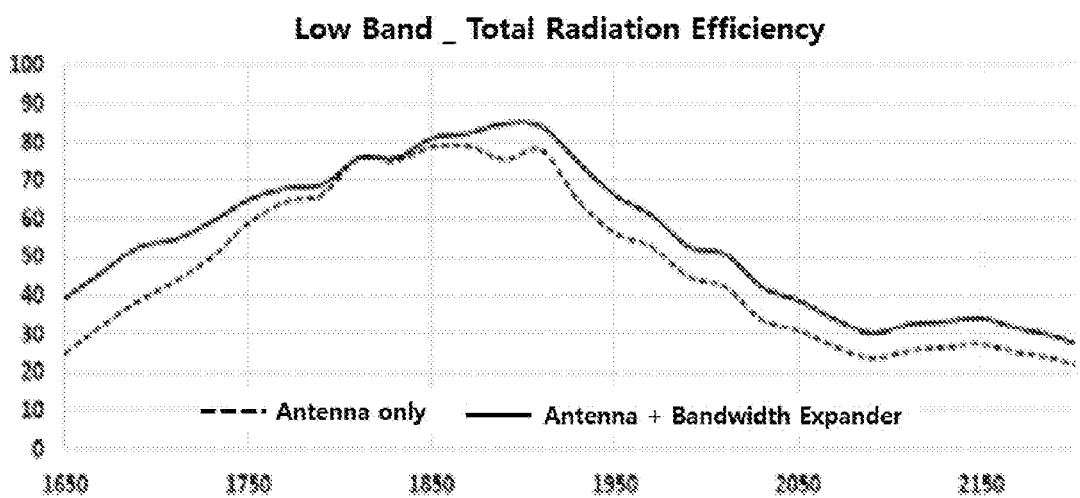

FIG. 12B is a graph representing radiation efficiencies in the second resonant frequency band for a case where the bandwidth expander proposed in the present invention is provided and a case where only an LC matching circuit is provided. Like FIG. 12A, compared to the case where only the matching circuit is applied, in the case (represented with a solid line) where the bandwidth expander is included, the total radiation efficiency is improved by reducing a mismatching loss due to a bandwidth expansion effect at frequencies around both end boundaries and an entirely similar or better radiation efficiency may be obtained.

As described above, a bandwidth expander according to the present invention, which is disposed between an internal RF system and an antenna having an arbitrary characteristic, may be applied to a front stage or a rear stage of a matching circuit and expands the bandwidth of the antenna, or may be directly applied to a rear stage of the antenna without the matching circuit and expands the bandwidth at the same time with impedance matching of the antenna.

In the embodiment, it is exemplified that the horizontal cross-sectional shapes of the coil 1 and coil 2 are rectangular, but they are not limited thereto and may have circular or other polygonal shapes.

Figure 13:
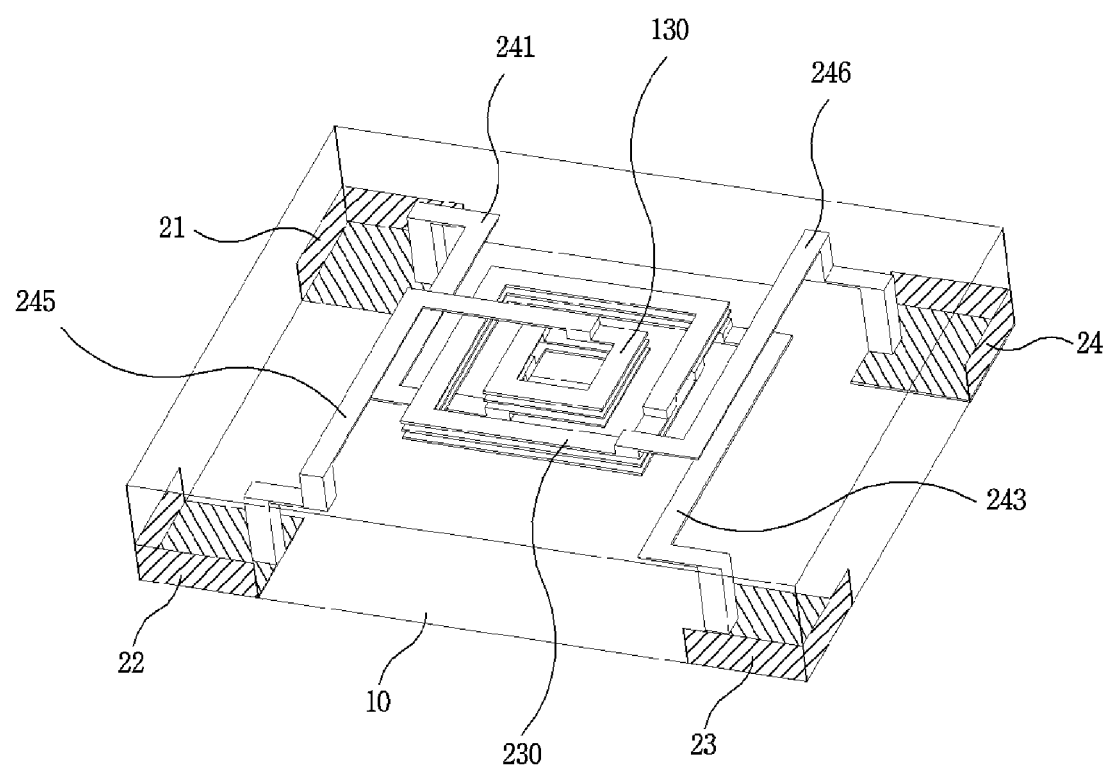
FIG. 13 illustrates an antenna bandwidth expander according to another embodiment of the present invention.
Figure 14:
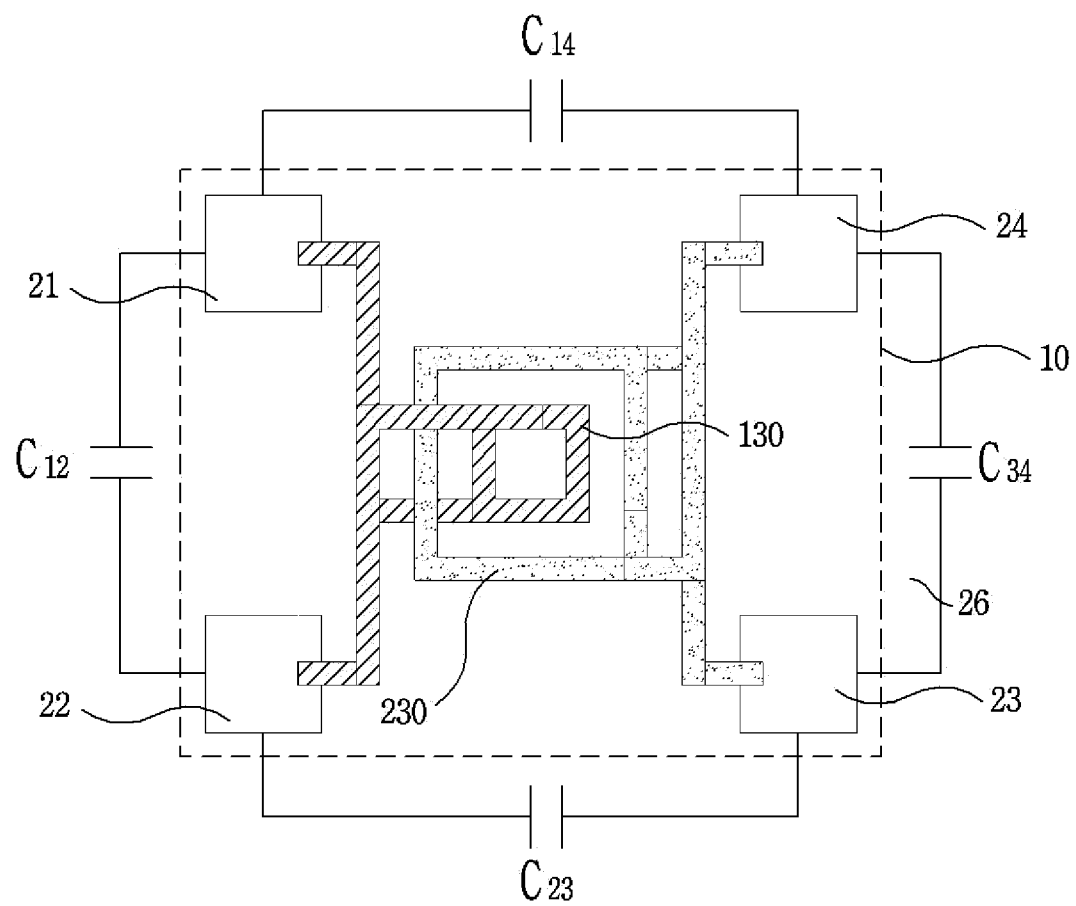
FIG. 14 is a connection diagram of an antenna bandwidth expander according to another embodiment of the present invention.
Figure 15:
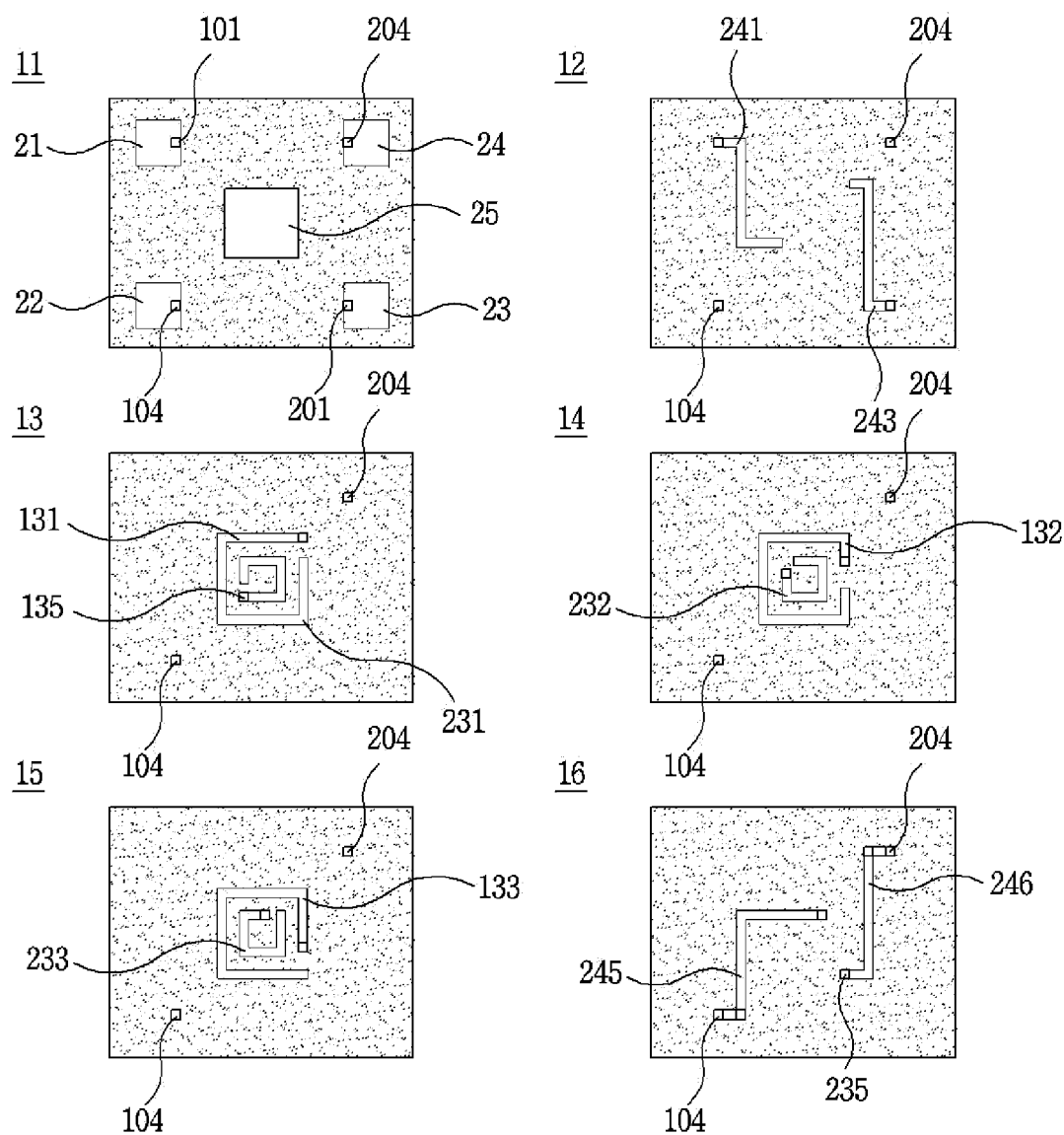
FIG. 15 is an internal plan view of an antenna bandwidth expander according to another embodiment of the present invention.

FIG. 13 illustrates a bandwidth expander according to another embodiment of the present invention, FIG. 14 is a connection diagram of the bandwidth expander according to the other embodiment of the present invention, and FIG. 15 is an internal plan view of the bandwidth expander according to the other embodiment of the present invention.

The antenna bandwidth expander of the present embodiment does not include a capacitor pattern therein in comparison to the antenna bandwidth expander of the above-described embodiment, but includes the coil 1 130 and the coil 2 230 and the connection patterns 241, 243, 245, and 246.

In detail, referring to FIG. 13, conduction terminals 21, 22, 23, and 24 are formed at the four bottom corners of the ceramic body 10 and the conduction terminals 21, 22, 23, and 24 may extend along the side walls of the ceramic body 10 in order to improve soldering strength.

As illustrated in FIG. 15, at the bottom center, the ground terminal 25 may be formed or a dummy terminal for improving the soldering strength may be formed, or none may be formed.

As illustrated in FIG. 15, the ceramic body 10 may be formed by stacking the ceramic sheets 11 to 16 and by plastic-working them in an LTCC technique.

The conductive terminals 21, 22, 23, and 24 are formed at the bottom four corners of the ceramic sheet 11, the ground terminal 25 is formed at the center thereof, and the via holes 101, 104, 201, and 204 are formed in the ceramic sheet 11 at certain positions of the respective conductive terminals 21, 22, 23, and 24.

The connection patterns 241 and 243 are formed on, and the via holes 104 and 204 electrically connecting them to the conduction terminals 21, 22, 23, and 24 of the ceramic sheet 11 are formed in the top surface of the ceramic sheet 12.

In addition, the coil patterns 131, 132, and 133, and 231, 232, and 233 are formed on, and the via holes 104 and 204 are formed in the ceramic sheets 13, 14, and 15. The connection patterns 245 and 246 are formed on and the via holes 104 and 204 are formed in the ceramic sheet 16.

Overall, the coil patterns 131, 132, and 133, and 231, 232, and 233 form the magnetically coupled coil 1 130 and coil 2 230.

Like the above-described embodiments, the antenna bandwidth expander of the present embodiment is disposed between the antenna and the internal RF system, and the conductive terminal 21 is electrically connected to the feeding port connected to the antenna and the conductive terminal 23 is electrically connected to the output port of the RF system.

Accordingly, the signal energy delivered from the RF system through the conductive terminal 23 is delivered to the coil 2 230, and the induction current is coupled to the coil 1 130 by a magnetic flux component of a magnetic field generated by the coil 2 230 and is delivered to the conductive terminal 21 and then to the feeding port of the antenna.

Referring to FIG. 14, the ceramic body 10 is mounted on a circuit board, and conduction pads corresponding to the conduction terminals 21, 22, 23, and 24 are formed on the circuit board and capacitors $C_{14}$, $C_{12}$, $C_{32}$, and $C_{34}$ are mounted between the conduction pads.

Accordingly, as the ceramic body 10 of the antenna bandwidth expander is mounted in the circuit board, the capacitors $C_{14}$ and $C_{12}$, and $C_{32}$ and $C_{34}$ are connected in parallel with the coil 1 and coil 2, and load capacitance values between the conduction terminals 21, 22, 23, and 24.

As the above-described embodiment, the capacitor $C_{14}$ connected to the coil 2 230 in serial and the capacitor $C_{12}$ connected to the coil 2 230 in parallel are coupled to the coil 2 230 to form an LC resonant circuit, and the capacitor $C_{12}$ connected to the coil 1 130 in serial and the capacitor $C_{32}$ connected to the coil 1 130 in parallel are coupled to the coil 1 130 to form another LC resonant circuit.

Similarly, although each of the coil 1 130 and the coil 2 230 is not electrically connected, the induction current is coupled to the coil 1 130 by the magnetic flux component of the magnetic field generated by the coil 2 230 and the signal energy at the output port of the RF system is delivered to the feeding port of the antenna.

According to the embodiment, since it is not necessary to implement a capacitor inside the ceramic body of the antenna bandwidth expander, the structure is simple and it is easy to change capacities of the capacitors $C_{14}$, $C_{12}$, $C_{32}$, and $C_{34}$, and therefore, the characteristic may be easily adjusted.

In addition, according to the impedance characteristic of an antenna and a terminal structure, the structure may be changed such that the conduction terminal 21 is connected to the output port of the RF system and the conduction terminal 23 is connected to the antenna.

According to the foregoing configuration, the antenna bandwidth expander may expand a bandwidth of an antenna in which a broad frequency characteristic is necessary.

In addition, due to the simple structure of the antenna bandwidth expander, the manufacturing cost thereof is low and a mounting area thereof in an electronic device, such as a smartphone, is not largely occupied.

Furthermore, the antenna bandwidth expander may be used independently or together with a matching circuit at a rear end of an antenna, and may increase the degree of freedom for system design since it is applicable to a front or rear stage of the matching circuit.

While the present invention has been described in detail, it should be understood that various changes, substitutions and alterations can be made hereto without departing from the spirit and scope of the invention as defined by the appended claims.

What is claimed is:

1. An antenna bandwidth expander mounted between an RF system and an antenna to be electrically connected thereto in a circuit board, the antenna bandwidth expander comprising:
    a first conduction terminal electrically connected to the antenna;
    a second conduction terminal electrically connected via the first conduction terminal and a first capacitor, the second conduction terminal being connected to a node supplied with a voltage from a first external inductor;
    a first coil electrically connected between the first and second conduction terminals;
    a third conduction terminal electrically connected to an output port of the RF system;
    a fourth conduction terminal electrically connected via the third conduction terminal and a second capacitor, the fourth conduction terminal being connected to a node supplied with a voltage from a second external inductor, in which the voltage from the second external inductor is different from the voltage from the first external inductor;
    a second coil electrically connected between the third and fourth conduction terminals; and
    third and fourth capacitors respectively disposed between the second and third conduction terminals and between the first and fourth conduction terminals,
    wherein the second and fourth capacitors respectively connected to the second coil in parallel and in serial to form a resonant circuit in a first frequency band that is a low frequency band, and the first and third capacitors respectively connected to the first coil in parallel and in serial to form a resonant circuit in a second frequency band that is a high frequency band, and
    wherein the first and second coils are wound in opposite directions to be magnetically coupled.

2. The antenna bandwidth expander of claim 1, wherein the first coil is positioned inside the second coil.

3. The antenna bandwidth expander of claim 1, wherein horizontal cross-sectional shapes of the first and second coils are a circle or a polygon.

4. The antenna bandwidth expander of claim 1, wherein the second and fourth conduction terminals are electrically connected to a ground via an external inductor.

5. An antenna bandwidth expander mounted between an RF system and an antenna to be electrically connected thereto in a circuit board, the antenna bandwidth expander comprising:
    a ceramic body having first to fourth conduction terminals separately formed on a bottom surface and including therein a first coil electrically connected between the first and second conduction terminals and a second coil electrically connected between the third and fourth terminals, the second conduction terminal being connected to a node supplied with a voltage from a first external inductor, and the fourth conduction terminal being connected to a node supplied with a voltage from a second external inductor, in which the voltage from the second external inductor is different from the voltage from the first external inductor; and
    first to fourth capacitors disposed between first to fourth conduction pads formed in correspondence to the first to fourth conduction terminals in the circuit board,
    wherein the first conduction terminal is electrically connected to the antenna, the third conduction terminal is electrically connected to an output port of the RF system, the second and fourth capacitors are respectively connected to the second coil in parallel and in serial to form a first resonant circuit in a first frequency band that is a low frequency band, and the first and third capacitors are respectively connected to the first coil in parallel and in serial to form a resonant circuit in a second frequency band that is a high frequency band, and
    wherein the first and second coils are wound in opposite directions to be magnetically coupled.

6. The antenna bandwidth expander of claim 5, wherein the first coil is positioned inside the second coil.

7. The antenna bandwidth expander of claim 5, wherein horizontal cross-sectional shapes of the first and second coils are a circle or a polygon.

8. The antenna bandwidth expander of claim 5, wherein the second and fourth conduction terminals are electrically connected to a ground via an external inductor.

* * * * *